May 8, 1923.

A. G. BYERLEY 1,454,698

POWER TRACTOR

Filed Feb. 17, 1921

Inventor.
A.G.BYERLEY

By

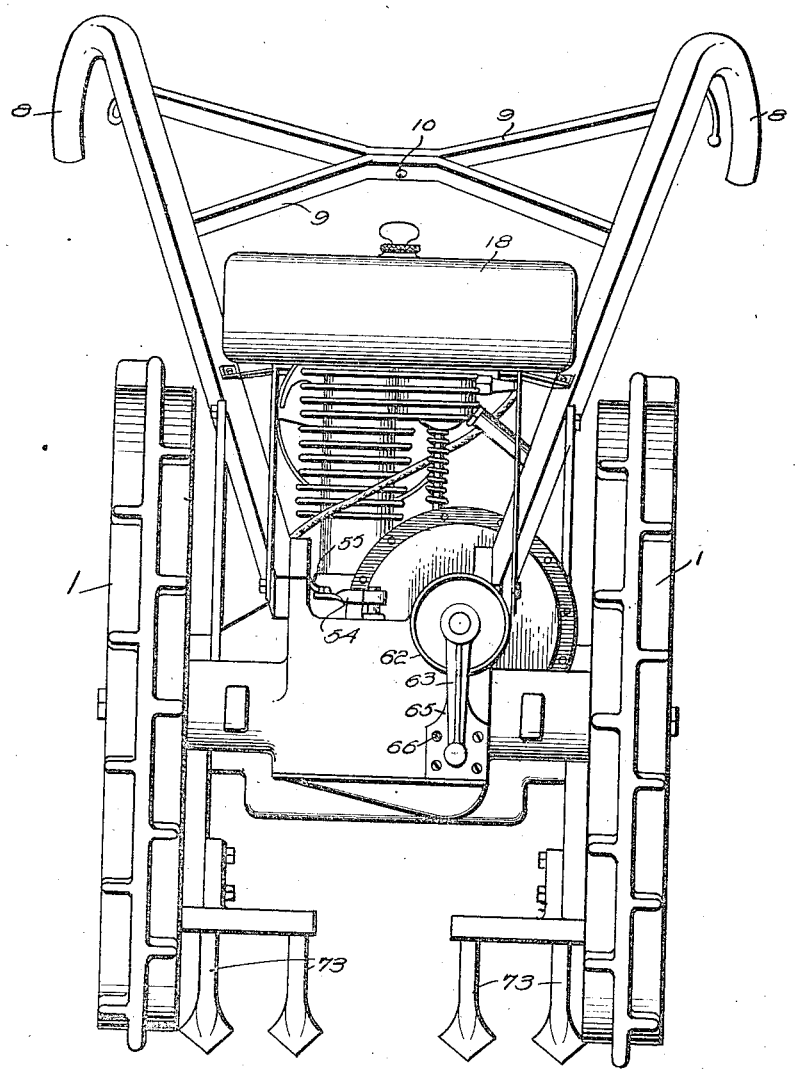

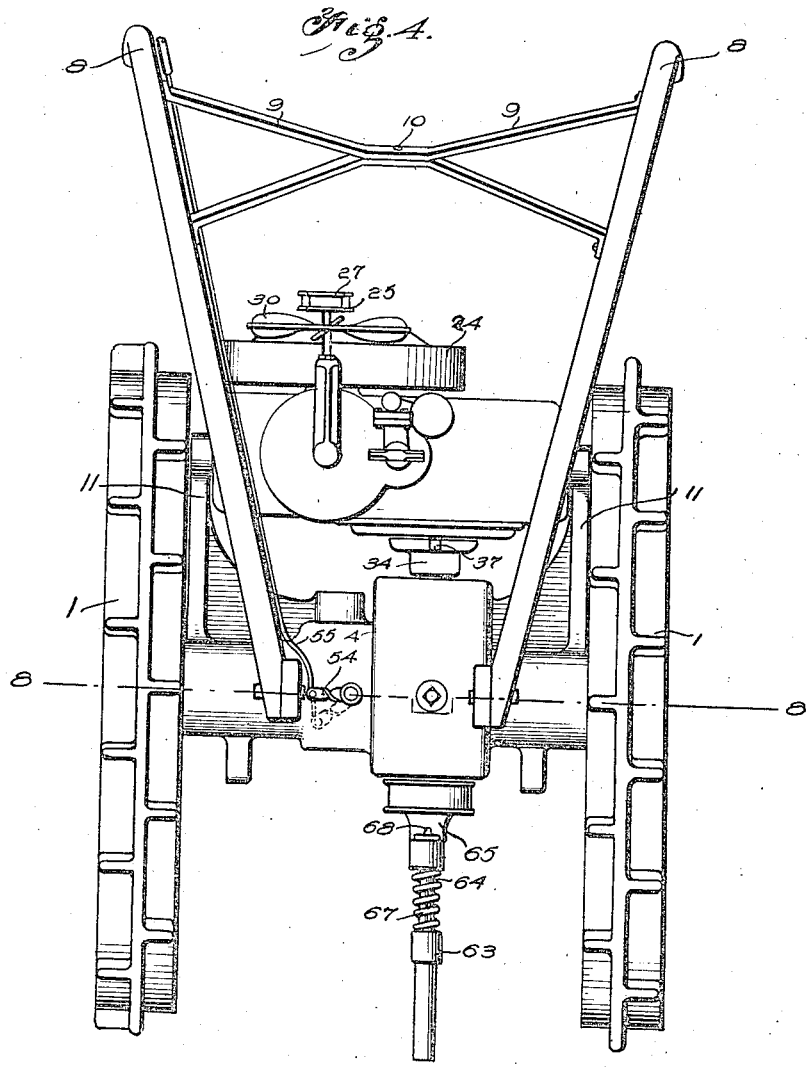

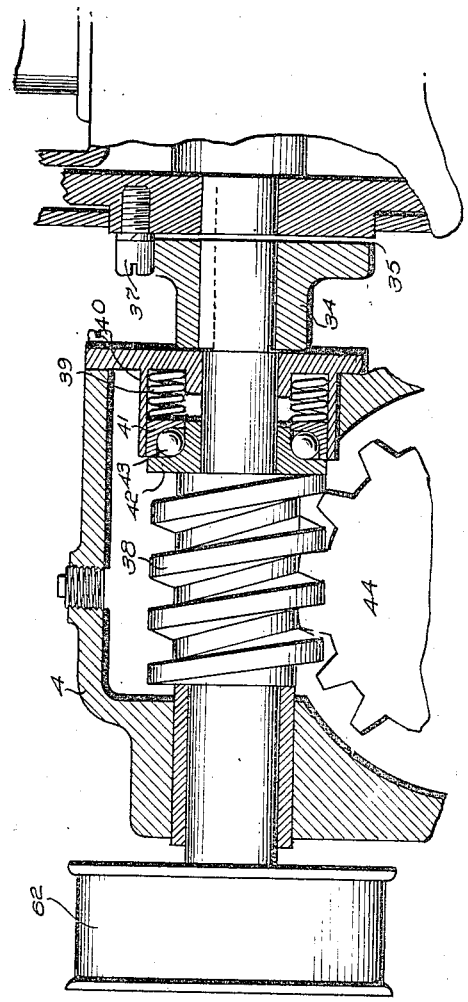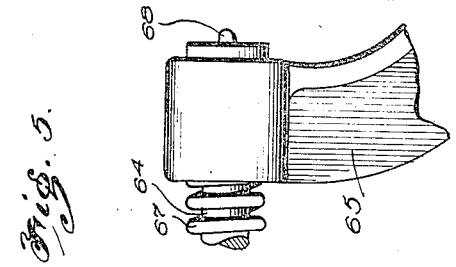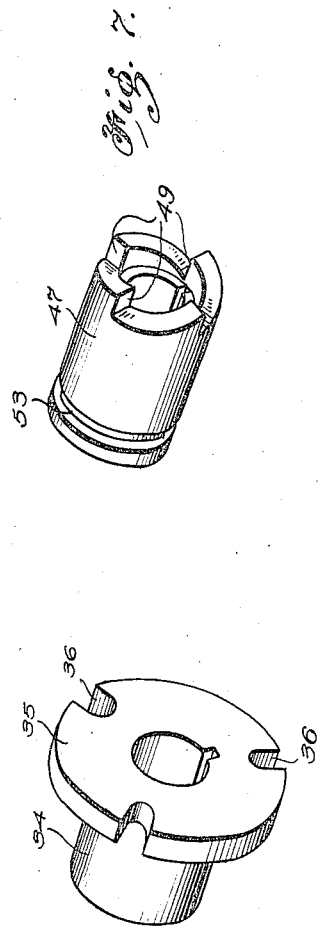

May 8, 1923.

A. G. BYERLEY

POWER TRACTOR

Filed Feb. 17, 1921

Inventor
A.G. BYERLEY

By

Attorney

Patented May 8, 1923.

1,454,698

UNITED STATES PATENT OFFICE.

ALBERT G. BYERLEY, OF SALEM, OHIO.

POWER TRACTOR.

Application filed February 17, 1921. Serial No. 445,644.

*To all whom it may concern:*

Be it known that I, ALBERT G. BYERLEY, a citizen of the United States, residing at Salem, in the county of Columbiana and State of Ohio, have invented certain new and useful Improvements in Power Tractors, of which the following is a specification.

This invention relates to power tractors, and it comprises a wheeled frame adapted to support suitable agricultural implements, an engine or motor mounted on the frame, a drive shaft connected to said engine, flexible connecting means between said shaft and said engine, a driven shaft or axle adapted to receive power from said drive shaft, said driven shaft having a worm wheel loosely mounted thereon and meshing with a worm on said drive shaft, a clutch keyed to said driven shaft, and adapted to engage said worm wheel, a spraying tank arranged on said frame, a pump adjacent said tank, and means for driving said pump from said drive shaft.

In the present invention, I have provided an agricultural implement with which various different tools, such as cultivators, plows, harrows, and the like, may be employed and which consists of a pair of wheels connected to each other by an axle and a pair of diverging handles secured to the axle frame whereby the device may be guided by the operator. A suitable source of power is arranged on the frame whereby a motor driven device is provided which supplies the power for moving the implement and performing the work. It is, therefore, necessary for the operator to merely guide the implement, but at the same time the device is sufficiently small that it may be moved from place to place by hand, as in turning at the ends of rows in plowing or cultivating.

The axle on which the traction wheels are mounted is a "live" axle, driven by the engine, and this axle is enclosed in a housing similar to the housing of the rear axle of a motor vehicle, the housing forming the frame of the implement to which the handles are secured and by which the motor is supported.

In the present invention, I have provided an advantageous connection between the drive shaft and the axle, consisting of a worm mounted on the driven shaft, and a worm gear loosely mounted on the axle. The worm wheel may be connected to the shaft by means of a clutch slidably mounted on the axle and adapted to engage a clutch member formed on one face of the worm wheel.

It is frequently necessary to spray growing plants with various compositions to keep them free from insects, and I find it advantageous to arrange a spraying tank on the frame of the tractor, the spraying tank being supported in any suitable manner and being provided with a pump for spraying purposes. The pump may be driven by means of a belt or other suitable connecting means from the main drive shaft, and as shown, the pulley on the drive shaft over which the pump belt passes is arranged adjacent the engine starting crank.

In the accompanying drawings, I have shown one embodiment of the invention. In this showing:

Figure 3 is a rear elevation,

Figure 4 is a plan view,

Figure 5 is a view similar to Figure 2, on an enlarged scale,

Figure 6 is a detail perspective view of the connecting means between the main shaft and the motor.

Figure 7 is a perspective view of the clutch member,

Figure 1:
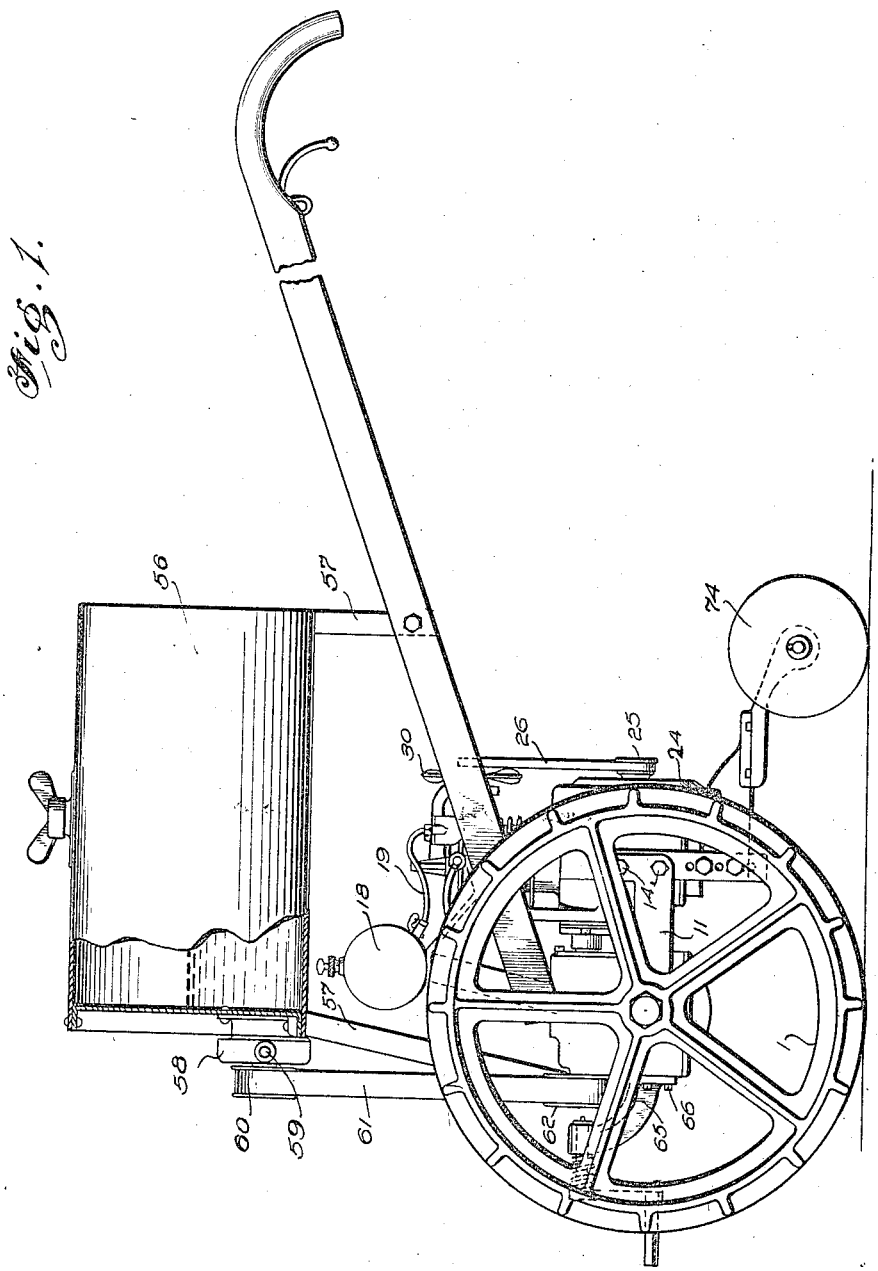
Figure 1 is a side elevation, parts being shown in section.
Figure 2:
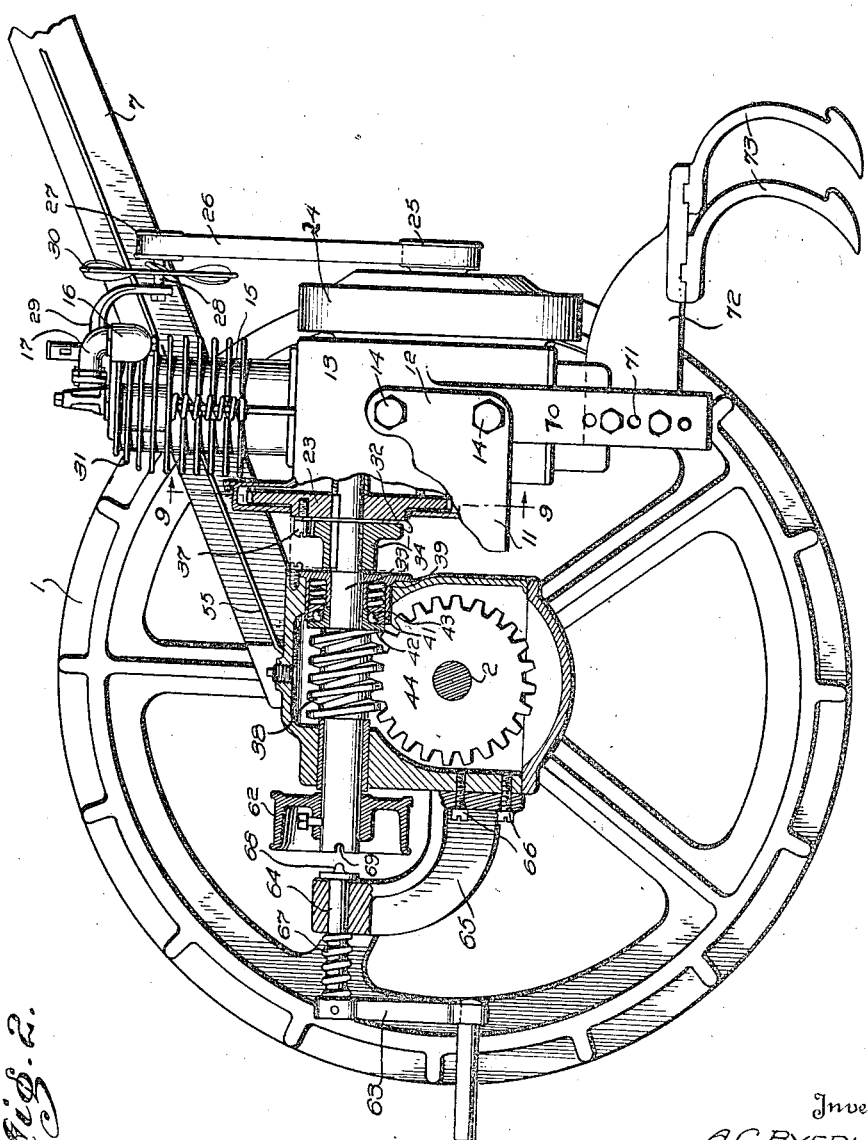
Figure 2 is a central vertical longitudinal sectional view.
Figure 8:
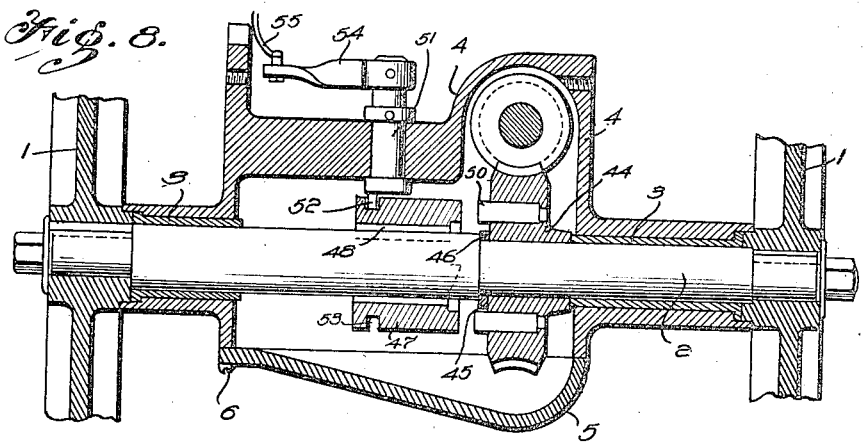
Figure 8 is a transverse sectional view on line 8—8 of Figure 4.
Figure 9:
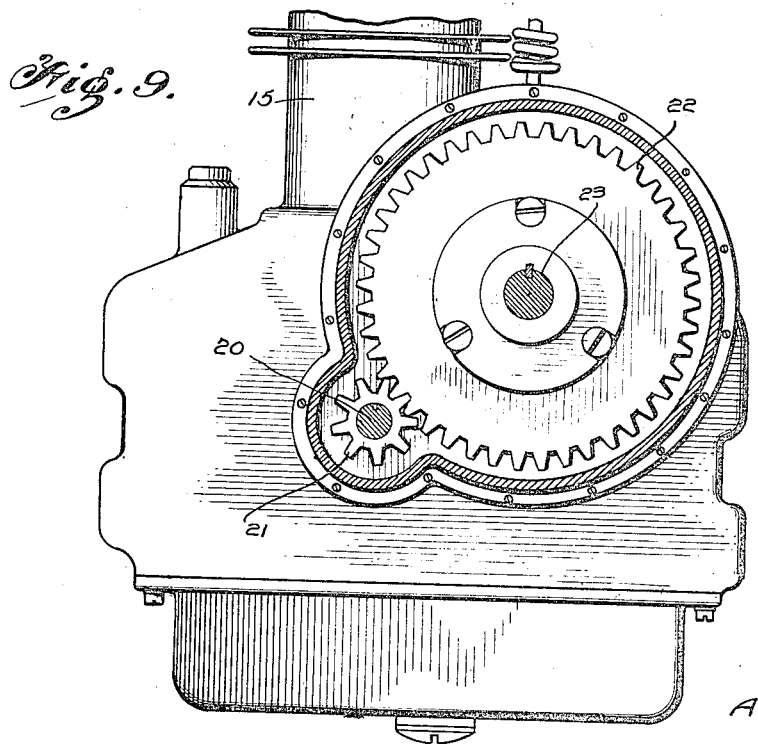
Figure 9 is a sectional view on line 9—9 of Figure 2.

Referring to the drawings, the reference numeral 1 designates the traction wheels which are suitably spaced from each other and connected by an axle 2. The wheels are keyed to the axle to revolve therewith, the axle being mounted in bearings 3 in a casing 4, forming the frame of the machine. As shown, the bottom of the casing is made separable, as at 5, and is connected thereto by any suitable means, such as bolts 6. The casing 4 forms the frame of the machine to which the handles are connected and supports the motor and other operating mechanism. A pair of handles 7 are secured to the casing in any suitable manner and these handles diverge rearwardly and are slightly inclined upwardly whereby the rear portions 8 are arranged at the proper elevation to be grasped by the operator. Suitable bracing members 9 may be arranged between the handles and connected to each other, as at 10.

The casing is provided with rearwardly extended lugs or brackets 11 arranged at each side and provided with enlarged ends 12. A motor 13 is supported between these brackets by means of bolts 14. Any suitable type of motor may be employed, but in the present disclosure I have illustrated an internal combustion engine 15, of the conventional type. The engine is provided with a carburetor 16, connected to the intake manifold 17, and communicating with a source of fuel 18, by means of pipe 19. The fuel tank 18 may be arranged on the frame at any suitable point. The engine is of the usual construction and a detail description thereof is deemed unnecessary. The engine is provided with a crank shaft 20, having a pinion 21, mounted thereon and meshing with a gear 22 on the shaft 23. A fly wheel 24 is mounted on the crank shaft, and this shaft is provided with a pulley 25, adapted to receive a belt 26 passing over a pulley 27 arranged on a shaft 28. The shaft 28 is supported on a bracket 29 and carries a fan 30, which is adapted to supply air to the engine for cooling purposes. The outer surface of the engine is provided with ribs 31 to increase the radiating surface.

The shaft 23 is provided with a flanged plate 32 on one end, the plate being keyed thereto to revolve therewith. The main drive shaft 33 is connected to the shaft 23 by means of a flexible connecting member 34 which is keyed to the main drive shaft and provided with a flange 35. Arranged at suitable intervals in the periphery of the flange, are notches 36 for the reception of bolts 37, which engage the flanged plate 22. The drive shaft extends through the housing or casing 4, and is provided with a worm 38 mounted thereon or made integral therewith. The worm is normally held in proper position by means of a flexible thrust member of sufficient compression strength to normally hold the worm in position under normal load but capable of giving to a variable degree under starting shock. This thrust member comprises a plurality of springs 39 arranged in a combination thrust and radial bearing 40 carried by the casing. A bearing plate 41 is arranged at the outer end of the springs, and this plate engages a flange 42, formed on the adjacent end of the worm. Suitable anti-friction rollers 43 may be arranged between plate 41 and the flange 42.

The driven shaft or axle 2 is slightly spaced from the drive shaft and is provided with a worm wheel, the gear 44 meshing with the worm 38. This gear is loosely mounted on the shaft and is held in position by a thrust collar 45, engaging a shoulder 46 on the axle. A clutch member comprising a sleeve 47 is slidably mounted on the axle 2 and keyed thereto, as at 48, to prevent relative rotation. The face of the sleeve adjacent the worm wheel is provided with clutch teeth 49 adapted to engage pins 50 carried by the worm wheel. These pins may be inserted into the gear, under pressure, and allowed to project sufficiently to engage the teeth 49 forming a very efficient construction which is of simple design. Any other similar means may be employed to provide engaging teeth on the gear. The clutch is operated by means of a shaft 51 extending upwardly through the housing and provided with an eccentrically mounted pin 52, adapted to enter a groove 53 of the sleeve 47. By revolving the shaft, the clutch is thrown in and out. An operating crank 54 is secured to the outer end of shaft 51, and is provided with a rod 55 which may extend upwardly to any convenient point within reach of the operator.

A spraying tank 56 is suitably supported on the frame by means of supporting members 57. A pump 58 communicates with the tank and is provided with an outlet 59, to which may be secured a flexible hose or other means for conveying the spraying liquid from the pump. The pump shaft is provided with a pulley 60, adapted to receive a belt 61 passing over a pulley 62 on the main shaft, to supply power to operate the pump. A starting crank 63 is mounted on the front of the machine, the crank being secured to a shaft 64 extending through a bracket 65, which is bolted to the frame or casing, as at 66. A spring 67 normally maintains the crank in disengaged position, the inner end of the crank being provided with lugs or projections 68, adapted to enter recesses 69 in the end of the shaft.

Any type of agricultural implements may be mounted on the frame. As shown, a pair of arms 70 are secured to the brackets 11 and extend downwardly, these arms being provided with a plurality of openings 71, whereby suitable agricultural tools may be secured to the frame at different elevations. A supporting member 72 is secured to these arms and any type of agricultural implements designated generally at 73, may be arranged on the supporting member. Referring to Figure 1 of the drawings, when the device is being employed as a spraying apparatus, a roller 74 may be secured to the supporting member to properly balance the tractor.

It is to be understood that the form of my invention herewith shown and described is to be taken as a preferred example of the same, and that various changes in the shape, size, and arrangement of parts may be resorted to without departing from the spirit of my invention or the scope of the subjoined claims.

Having thus described my invention, I claim:

1. In a two-wheeled power vehicle, an axle, traction wheels mounted thereon, a housing for said axle, said housing forming the frame of the vehicle, a pair of brackets secured to said housing and projecting therefrom, an engine, means for removably securing said engine to said brackets, said engine including a crank shaft, a pinion carried by said crank shaft, a drive shaft, a gear carried by said engine and meshing with the pinion on the crank shaft of the engine, means for detachably connecting said gear with said drive shaft, a worm mounted on said drive shaft, a worm gear loosely mounted on said axle, a clutch keyed to said axle and adapted to engage said worm gear, and means for operating said clutch.

2. In a two-wheeled power vehicle, an axle, traction wheels mounted thereon, a housing for said axle, said housing forming the frame of the vehicle, an engine including a crank shaft, means for removably supporting said engine on said housing, a pinion carried by said crank shaft, a drive shaft, a gear rotatably carried by said engine and meshing with the pinion on the crank shaft of the engine, means for detachably connecting said drive shaft with said gear, a worm mounted on said drive shaft, a worm gear loosely mounted on said axle, a clutch keyed to said axle and adapted to engage said worm gear, and means for operating said clutch.

3. In a two-wheeled, power vehicle, an axle, traction wheels mounted thereon, a housing for said axle, said housing forming the frame of the vehicle, an engine supported on said housing, a drive shaft flexibly connected to said engine, a worm gear slidably mounted on said shaft, a resilient thrust member normally maintaining said worm gear in operative position, a worm wheel loosely mounted on said axle, and meshing with said worm gear, a clutch keyed to said axle and adapted to engage said gear, and means for operating said clutch.

4. In a two-wheeled, power vehicle, an axle, traction wheels mounted thereon, a housing for said axle, said housing forming the frame of the vehicle, an engine detachably supported on said frame, a drive shaft mounted in said housing and adapted to be driven by said engine, a worm gear on said drive shaft, a resilient thrust member mounted between said worm gear and said housing, a worm wheel loosely mounted on said axle and meshing with said worm gear, said wheel being provided with clutch pins, a clutch collar slidably mounted on said axle and rotatable therewith, said collar being provided with ratchet teeth adapted to engage the pins on said worm wheel, and means for operating said clutch collar.

5. In a two-wheeled, power vehicle, an axle, traction wheels mounted thereon, a housing for said axle, said housing forming the frame of the vehicle, an engine detachably supported on said frame, said engine including a crank shaft, a pinion mounted on said crank shaft, an auxiliary shaft carried by said engine, a gear fixed to said auxiliary shaft and meshing with said pinion, a drive shaft mounted in said housing adjacent and in alinement with said auxiliary shaft, flexible connecting means between said drive and auxiliary shafts, a worm gear mounted on said drive shaft, a resilient thrust member mounted between said worm gear and said housing, a worm wheel loosely mounted on said axle and meshing with said worm gear, said wheel being provided with clutch pins, a clutch collar slidably mounted on said axle and rotatable therewith, said collar being provided with ratchet teeth adapted to engage the pins on said worm wheel, and means for operating said clutch collar.

6. In a two-wheeled, power vehicle, an axle, traction wheels mounted thereon, a housing for said axle, said housing forming the frame of the vehicle, an engine detachably supported on said frame, said engine including a crank shaft, a pinion mounted on said crank shaft, an auxiliary shaft carried by said engine, a gear fixed to said auxiliary shaft and meshing with said pinion, said gear being provided upon one side with a plurality of projecting pins, a drive shaft mounted in said housing adjacent and in alinement with said auxiliary shaft, a flange mounted on said drive shaft and provided with notches adapted to receive the pins on said gear, a worm gear mounted on said drive shaft, a worm wheel loosely mounted on said axle and meshing with said worm gear, and means for locking said worm wheel to said axle.

7. In a two-wheeled power vehicle, a unit power plant embodying an engine including a crank shaft, a pinion carried by the crank shaft and a gear meshing with the pinion, an axle, traction wheels mounted thereon, a frame, means for removably securing said unit power plate to said frame, and transmission means between said gear and said axle including a shaft adjacent and in axial alinement with said gear, said shaft being provided with means for detachably securing it to said gear to be driven thereby.

8. In a two-wheeled power vehicle, a unit power plant embodying an engine including a crank shaft, a pinion carried by the crank shaft and a gear meshing with the pinion and provided upon one side with an outstanding pin, an axle, traction wheels mounted thereon, a frame, means for removably securing said unit power plant to said frame, and transmission means between said gear and said axle including a shaft adjacent and in axial alinement with said gear, said shaft being provided with a plate having a recess therein to loosely receive the pin on said gear.

9. In a two-wheeled power vehicle, an axle, traction wheels mounted thereon, a housing for said axle, a drive shaft mounted in said housing transversely of said axle and projecting upon opposite sides of the housing, transmission means including a clutch connected between said drive shaft and said axle, an engine supported by said housing adjacent one projecting end of said drive shaft and connected therewith, a power take-off pulley mounted upon the opposite end of said drive shaft, a bracket carried by said housing and having its end arranged adjacent said pulley, and a starting crank journaled in the end of said bracket and adapted to engage the adjacent end of said drive shaft.

In testimony whereof I affix my signature in presence of two witnesses.

ALBERT G. BYERLEY.

Witnesses:
JOSEPH CALLADINE,
SCOTT SPIKER.